US011889136B2

(12) United States Patent
Sheppard et al.

(10) Patent No.: US 11,889,136 B2
(45) Date of Patent: *Jan. 30, 2024

(54) ASSIGNING SYNTHETIC RESPONDENTS TO GEOGRAPHIC LOCATIONS FOR AUDIENCE MEASUREMENT

(71) Applicant: The Nielsen Company (US), LLC, New York, NY (US)

(72) Inventors: Michael Sheppard, Holland, MI (US); Edward Murphy, North Stonington, CT (US); Chris Samuel Redino, New York, NY (US); Michael D. Morgan, Bartlett, IL (US); Jonathan Sullivan, Hurricane, UT (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,873

(22) Filed: Sep. 19, 2022

(65) Prior Publication Data

US 2023/0077390 A1  Mar. 16, 2023

Related U.S. Application Data

(63) Continuation of application No. 17/195,306, filed on Mar. 8, 2021, now Pat. No. 11,451,844, which is a
(Continued)

(51) Int. Cl.
*H04N 21/258* (2011.01)
*H04N 21/442* (2011.01)
(Continued)

(52) U.S. Cl.
CPC . *H04N 21/25841* (2013.01); *H04N 21/25883* (2013.01); *H04N 21/2668* (2013.01); *H04N 21/44222* (2013.01); *H04N 21/252* (2013.01)

(58) Field of Classification Search
CPC ....... H04N 21/25841; H04N 21/44222; H04N 21/252; H04N 21/25883; H04N 21/2668
See application file for complete search history.

(56) References Cited

U.S. PATENT DOCUMENTS 5,991,710 A   11/1999  Papineni et al.
7,483,813 B2   1/2009  Goodman
(Continued)

OTHER PUBLICATIONS

Mathematics Stack Exchange, "Converting Standard Constrained Optimization Problems into an Unconstrained One," Nov. 5, 2015, 2 pages. Retrieved May 16, 2017, from https://math.stackexchange.com/questions/1513891/convertingstandardconstrainedoptimizationproblemintoanunconstrainedone.
(Continued)

*Primary Examiner* — Yassin Alata

(57) ABSTRACT

Example methods, apparatus, systems and articles of manufacture (e.g., physical storage media) to assign respondents to geographic locations for audience measurement are disclosed. Example apparatus disclosed herein are to determine a set of constraints based on aggregate values of demographic features associated with respective ones of the geographic locations. Disclosed example apparatus are also to construct a model to return probabilities that respective ones the respondents are associated with the respective ones of the geographic locations, the model to have a set of parameters, respective ones of the parameters to be associated with respective ones of the constraints. Disclosed example apparatus are further to evaluate the model based on values of the set of parameters and values of the demographic features for a first one of the respondents to determine a set of probabilities that the first respondent is to be assigned to respective ones of the geographic locations.

20 Claims, 8 Drawing Sheets

Related U.S. Application Data continuation of application No. 16/596,261, filed on Oct. 8, 2019, now Pat. No. 10,945,013, which is a continuation of application No. 15/799,646, filed on Oct. 31, 2017, now Pat. No. 10,448,074.

(51) Int. Cl.
*H04N 21/2668* (2011.01)
*H04N 21/25* (2011.01)

(56) References Cited

U.S. PATENT DOCUMENTS

| | | |
|---|---|---|
| 7,672,910 B1 | 3/2010 | Kumar |
| 7,719,978 B2 | 5/2010 | Taubman et al. |
| 7,788,094 B2 | 8/2010 | Farahani et al. |
| 8,290,892 B1 | 10/2012 | Kumar |
| 8,700,403 B2 | 4/2014 | Weng et al. |
| 9,008,807 B2 | 4/2015 | Shapiro et al. |
| 10,448,074 B2 | 10/2019 | Sheppard et al. |
| 10,945,013 B2 | 3/2021 | Sheppard et al. |
| 2014/0310048 A1 | 10/2014 | Murray et al. |
| 2015/0046226 A1* | 2/2015 | Algranati ............ G06Q 30/0203 705/7.32 |
| 2019/0132624 A1 | 5/2019 | Sheppard et al. |
| 2020/0112757 A1 | 4/2020 | Sheppard et al. |
| 2021/0195267 A1 | 6/2021 | Sheppard et al. |

OTHER PUBLICATIONS

Smith, "Log-Linear Models," Dec. 2004, 9 pages.
United States Patent and Trademark Office, "Notice of Allowance," mailed in connection with U.S. Appl. No. 15/799,646, dated Jun. 5, 2019, 8 pages.
United States Patent and Trademark Office, "Non-final Office Action," mailed in connection with U.S. Appl. No. 15/799,646, dated Oct. 19, 2018, 12 pages.
United States Patent and Trademark Office, "Notice of Allowance," mailed in connection with U.S. Appl. No. 16/596,261, dated Oct. 29, 2020, 7 pages.
United States Patent and Trademark Office, "Non-final Office Action," mailed in connection with U.S. Appl. No. 16/596,261, dated Jun. 26, 2020, 5 pages.
United States Patent and Trademark Office, "Notice of Allowance," mailed in connection with U.S. Appl. No. 17/195,306, dated May 11, 2022, 7 pages.
United States Patent and Trademark Office, "Non-Final Office Action," mailed in connection with U.S. Appl. No. 17/195,306, dated Feb. 3, 2022, 31 pages.

* cited by examiner

305

| Person | F0 | F1 | F2 | F3 | F4 |
|---|---|---|---|---|---|
| Person 1 | 1 | 1 | 2 | 8 | 10 |
| Person 2 | 1 | 8 | 7 | 4 | 1 |
| Person 3 | 1 | 5 | 5 | 9 | 10 |
| Person 4 | 1 | 8 | 7 | 1 | 1 |
| Person 5 | 1 | 7 | 9 | 10 | 10 |
| Person 6 | 1 | 9 | 8 | 3 | 2 |

310

| Class | Number | F1 | F2 | F3 | F4 |
|---|---|---|---|---|---|
| 1 | 3 | 13 | 16 | 27 | 30 |
| 2 | 3 | 25 | 22 | 8 | 4 |

315

| Class | Number | F1 | F2 | F3 | F4 |
|---|---|---|---|---|---|
| 1 | $\lambda_{(1,0)}$ | $\lambda_{(1,1)}$ | $\lambda_{(1,2)}$ | $\lambda_{(1,3)}$ | $\lambda_{(1,4)}$ |
| 2 | $\lambda_{(2,0)}$ | $\lambda_{(2,1)}$ | $\lambda_{(2,2)}$ | $\lambda_{(2,3)}$ | $\lambda_{(2,4)}$ |

| Class | Number | F1 | F2 | F3 | F4 |
|---|---|---|---|---|---|
| 1 | — | — | 16 | — | — |
| 2 | — | 25 | — | — | — |

415

| Class | Number | F1 | F2 | F3 | F4 |
|---|---|---|---|---|---|
| 1 | — | — | $\lambda_{(1,2)}$ | — | — |
| 2 | — | $\lambda_{(2,1)}$ | — | — | — |

| Class | Number | F1 | F2 | F3 | F4 |
|---|---|---|---|---|---|
| 1 | — | — | $\lambda_{(1,2)}$ | — | $\lambda_{(1,4)}$ |
| 2 | — | $\lambda_{(2,1)}$ | — | $\lambda_{(2,3)}$ | $\lambda_{(2,4)}$ |
| 3 | — | — | — | — | — |

| HOUSE \ DEMO | D1 | D2 | D3 |
|---|---|---|---|
| H1 | 2 | 7 | 3 |
| H2 | 3 | 4 | 0 |
| H3 | 7 | 6 | 5 |
| H4 | 1 | 1 | 2 |
| H5 | 7 | 5 | 8 |
| H6 | 8 | 4 | 1 |
| H7 | 2 | 7 | 3 |
| H8 | 6 | 3 | 1 |
| H9 | 7 | 6 | 4 |
| H10 | 8 | 7 | 4 |

610

| COUNTY \ DEMO | D1 | D2 | D3 |
|---|---|---|---|
| C1 | 13 | 9 | 6 |
| C2 | 12 | 16 | 11 |
| C3 | 7 | 6 | 4 |
| C4 | 18 | 18 | 8 |
| C5 | 1 | 1 | 2 |

620

| | H1 | H2 | H3 | H4 | H5 | H6 | H7 | H8 | H9 | H10 |
|---|---|---|---|---|---|---|---|---|---|---|
| C1 | 1.1% | 8.3% | 24.0% | 0.0% | 27.6% | 43.1% | 1.1% | 42.1% | 22.8% | 19.1% |
| C2 | 58.8% | 11.6% | 32.3% | 0.0% | 53.0% | 2.1% | 58.8% | 4.7% | 22.0% | 16.7% |
| C3 | 5.9% | 11.1% | 17.9% | 0.0% | 15.9% | 11.1% | 5.9% | 15.3% | 16.6% | 13.7% |
| C4 | 34.1% | 69.0% | 25.8% | 0.0% | 3.5% | 43.7% | 34.1% | 37.9% | 38.6% | 50.5% |
| C5 | 0.0% | 0.0% | 0.0% | 100.0% | 0.0% | 0.0% | 0.0% | 0.0% | 0.0% | 0.0% |

ASSIGNING SYNTHETIC RESPONDENTS TO GEOGRAPHIC LOCATIONS FOR AUDIENCE MEASUREMENT

RELATED APPLICATION(S)

This patent arises from a continuation of U.S. patent application Ser. No. 17/195,306 (now U.S. Pat. No. 11,451, 844), which is titled "ASSIGNING SYNTHETIC RESPONDENTS TO GEOGRAPHIC LOCATIONS FOR AUDIENCE MEASUREMENT," and which was filed on Mar. 8, 2021, which is a continuation of U.S. patent application Ser. No. 16/596,261 (now U.S. Pat. No. 10,945,013), which is titled "ASSIGNING SYNTHETIC RESPONDENTS TO GEOGRAPHIC LOCATIONS FOR AUDIENCE MEASUREMENT," and which was filed on Oct. 8, 2019, which is a continuation of U.S. patent application Ser. No. 15/799, 646 (now U.S. Pat. No. 10,448,074), which is titled "ASSIGNING SYNTHETIC RESPONDENTS TO GEOGRAPHIC LOCATIONS FOR AUDIENCE MEASUREMENT," and which was filed on Oct. 31, 2017. Priority to U.S. patent application Ser. No. 17/195,306, U.S. patent application Ser. No. 16/596,261 and U.S. patent application Ser. No. 15/799,646 is claimed. U.S. patent application Ser. No. 17/195,306, U.S. patent application Ser. No. 16/596,261 and U.S. patent application Ser. No. 15/799,646 are hereby incorporated herein by reference in their respective entireties.

FIELD OF THE DISCLOSURE

This disclosure relates generally to audience measurement and, more particularly, to assigning synthetic respondents to geographic locations for audience measurement.

BACKGROUND

Determining a size and demographic of an audience of a media presentation helps media providers and distributors schedule programming and determine a price for advertising presented during the programming. Accurate estimates of audience demographics also enable advertisers to target advertisements to certain types and sizes of audiences. To collect these demographics, an audience measurement entity enlists a group of media consumers (often called panelists) to cooperate in an audience measurement study (often called a panel) for some length of time. The media exposure habits and demographic data associated with these enlisted media consumers are collected and used to statistically determine the size and demographics of the entire audience of the media presentation. In some examples, this collected data (e.g., data collected via measurement devices) may be supplemented with survey information, for example, recorded manually by the presentation audience members.

In some examples, the audience measurement entity obtains (e.g., directly, or indirectly from a media service provider) return path data from media presentation devices (e.g., set-top boxes) that identifies tuning data for the media presentation devices. However, the return path data may not include any demographic data concerning the individuals and/or households associated with the media presentation devices. Thus, in some such examples, the audience measurement entity models and/or assigns synthetic (e.g., virtual) individuals and/or households to represent demographic data associated with the return path data.

BRIEF DESCRIPTION OF THE DRAWINGS

FIGS. 3-5 illustrate examples of demographic features, conditions and model parameters that may be used by the example geographic location classifier of FIG. 2 to assign synthetic respondents to geographic locations for audience measurement in accordance with the teachings of this disclosure.

FIG. 6 illustrate example classification operation performed by the example geographic location classifier of FIG. 2 to assign synthetic respondents to geographic locations for audience measurement in accordance with the teachings of this disclosure.

The figures are not to scale. Wherever possible, the same reference numbers will be used throughout the drawing(s) and accompanying written description to refer to the same or like parts, elements, etc.

DETAILED DESCRIPTION

Figure 1:
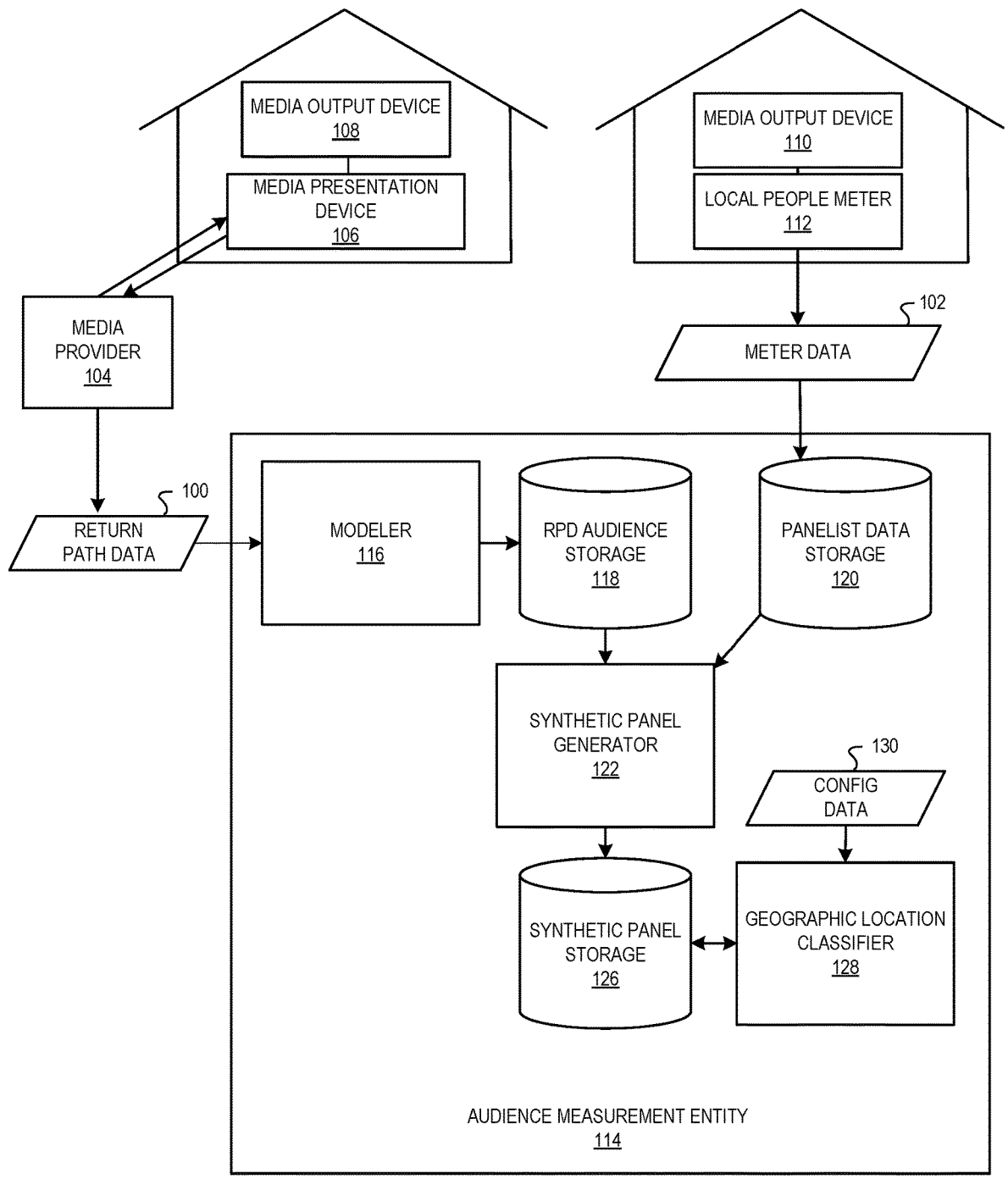
FIG. 1 is a block diagram of an example environment in which return path data and meter data are collected from media presentation locations and analyzed by an example audience measurement entity to generate example synthetic respondent level data in accordance with the teachings of this disclosure.

Example methods, apparatus, systems and articles of manufacture (e.g., physical storage media) to assign synthetic respondents to geographic locations for audience measurement are disclosed herein. Example apparatus disclosed herein to assign respondents to geographic locations for audience measurement include a constraint identifier to determine a set of constraints based on aggregate values of demographic features associated with respective ones of the geographic locations. Disclosed example apparatus also include a parameter evaluator to determine a set of parameters of a model that is to return probabilities that respective ones of the respondents are associated with the respective ones of the geographic locations. In some disclosed examples, respective ones of the parameters are associated with respective ones of the constraints. Disclosed example apparatus further include a location estimator to evaluate the model based on the set of parameters and values of the demographic features for a first one of the respondents to determine a set of probabilities that the first one of the respondents is to be assigned to respective ones of the geographic locations.

In some disclosed examples, the first one of the respondents is a synthetic respondent created to represent return path data reported by a media presentation device associated with a media service provider. In some such examples, the location estimator is to provide the set of probabilities to an audience measurement entity that is to perform audience measurement based on the return path data.

In some disclosed examples, the parameter evaluator is to determine the set of parameters based on the aggregate values of the demographic features associated with respective ones of the geographic locations and values of the demographic features for respective ones of the respondents.

For example, the parameter evaluator may determine the set of parameters by: (i) constructing a first function that combines, based on the set of parameters, the values of the demographic features for the respective ones of the respondents, (ii) constructing a second function that combines, based on the set of parameters, the aggregate values of the demographic features associated with the respective ones of the geographic locations, and (iii) determining the set of parameters based on a combination of the first function and the second function. In some such disclosed examples, the parameter evaluator is to determine the set of parameters to minimize the combination of the first function and the second function.

Additionally or alternatively, in some such disclosed examples, respective ones of the constraints correspond to respective ones of the aggregate values of the demographic features associated with geographic locations. In some such examples, the parameter evaluator is to construct the first function to include a linear combination of the values of the demographic features for the first one of the respondents in which respective ones of the values of the demographic features for the first one of the respondents are multiplied by respective ones of the set of parameters. Additionally or alternatively, in some such examples, the parameter evaluator is also to construct the second function to include a linear combination of the aggregate values of the demographic features associated with a first one of the geographic locations in which respective ones of the aggregate values of the demographic features for the first one of the geographic locations are multiplied by respective ones of the set of parameters.

These and other example methods, apparatus, systems and articles of manufacture (e.g., physical storage media) to assign synthetic respondents to geographic locations for audience measurement are disclosed in further detail below.

Audience measurement entities seek to understand the composition and size of audiences of media, such as television programming. Such information allows audience measurement entity researchers to, for example, report advertising delivery and/or targeting statistics to advertisers that target their media (e.g., advertisements) to particular audiences. Additionally, such information helps to establish advertising prices commensurate with audience exposure and demographic makeup (referred to herein collectively as "audience configuration"). One way to gather media presentation information is to gather the media presentation information from media output devices (e.g., such as gathering television presentation data from a set-top box (STB) connected to a television). As used herein, media presentation includes media output by a media device regardless of whether an audience member is present (e.g., including media output by a media output device at which no audience is present, media exposure to an audience member(s), etc.).

A media presentation device (e.g., STB) provided by a service provider (e.g., a cable television service provider, a satellite television service provider, an over-the-top service provider, a music service provider, a movie service provider, a streaming media provider, etc.) or purchased by a consumer may contain processing capabilities to monitor, store, and transmit tuning data (e.g., identifying which television channels are tuned by the media presentation device over time, identifying operating states of the media presentation device over time, identifying inputs received by the media presentation device over time, etc.) back to the service provider, which may provide at least some of the tuning data (e.g., after aggregation and/or other post-processing) to an audience measurement entity (e.g., The Nielsen Company (US), LLC.) to analyze media presentation activity. Data transmitted from a media presentation device back to a service provider providing the media (which may then aggregate and provide the data to an audience measurement entity) is herein referred to as return path data. Return path data includes tuning data. Tuning data is based on data received from the media presentation device while the media presentation device is on (e.g., powered on, switched on, and/or tuned to a media channel, streaming, etc.). Although return path data includes tuning data, return path data may not include other data (e.g., demographic data) related to the user exposed to the media corresponding to the media presentation device. Accordingly, return path data may not be able to be associated with specific viewers, demographics, locations, etc.

To determine aspects of media presentation data (e.g., which household member is currently exposed to a particular media presentation and the demographics of that household member), market researchers may perform audience measurement by enlisting a subset of the media consumers as panelists. Panelists or monitored panelists are audience members (e.g., household members, users, panelists, etc.) enlisted to be monitored, and who divulge and/or otherwise share their media activity and/or demographic data to facilitate a market research study. An audience measurement entity typically monitors media presentation activity (e.g., viewing, listening, etc.) of a monitored panelist via one or more audience measurement systems, such as one or more metering devices and/or a local people meter (LPM). Audience measurement typically includes determining the identity of the media being presented on a media output device (e.g., a television, a radio, a computer, etc.), determining data related to the media (e.g., presentation duration data, timestamps, channel data, etc.), determining demographic information of an audience, and/or determining which members of a household are associated with (e.g., have been exposed to) a media presentation. For example, an LPM in communication with an audience measurement entity communicates audience measurement (e.g., metering) data to the audience measurement entity. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In some examples, metering data (e.g., including media presentation data) collected by an LPM or other meter is stored in memory and transmitted via a network, such as the Internet, to a datastore managed by the audience measurement entity. Typically, such metering data is combined with additional metering data collected from multiple LPMs monitoring multiple panelist households. The metering data may include, but is not limited to, a number of minutes a household media presentation device was tuned to a particular channel, a number of minutes a household media presentation device was used by a household panelist member and/or a visitor (e.g., corresponding to a presentation session), demographics of the audience (which may be statistically projected based on the panelist data), information indicative of when the media presentation device is on or off, and/or information indicative of interactions with the media presentation device (e.g., channel changes, station changes, volume changes, etc.), etc. As used herein, a channel may be a tuned frequency, selected stream, an address for media (e.g., a network address), and/or any other identifier of a source and/or carrier of media.

Return path data provides valuable media exposure data, including media exposure data in locations where no panel data is available. However, return path data typically contains tuning data in the aggregate. Accordingly, return path data usually does not include respondent level data such as, but not limited to, detailed data relating to audience demographics and/or viewing data broken up into margins (e.g., quarter hours). Examples disclosed herein alleviate the lack of respondent level data in return path data by leveraging the respondent level data obtained from a panel of monitored panelists. Using examples disclosed herein, synthetic respondent level data corresponding to a group of synthetic, or virtual, panelists may be generated to correspond to the return path data, thereby increasing the value of return path data to a customer (e.g., of an advertising company).

In some examples, the audience measurement entity processes the collected and/or aggregated metering data for markets where a panel is maintained, obtains (e.g., from one or more service providers) return path data for markets where a media service provider provides service, and creates a synthetic panel to represent respondents associated with the return path data. The synthetic panel enables respondent-level data to be generated from the return path data. In some examples, a synthetic panel is created by selecting monitored panelists and/or any other users (e.g., in which demographic data is known), and/or combinations of monitored panelists and/or other users having known demographics, to be representative of the unknown respondents (e.g., subscribers) corresponding to the return path data homes. For example, these monitored panelists may be selected from a panel (e.g., a national panel of metered users) based on a regional proximity to a designated market area from which the return path data is obtained, a similarity between demographics of the monitored panelists and demographics of the return path data audience location, household media characteristics (e.g., how the households receive television signals (cable, satellite, over-the-air radio, etc.)), a similarity between media exposure characteristics of the monitored panelists and the return path data audience, etc. In some examples, demographic features associated with the selected monitored panelists (and/or other users) are assigned, possibly after one or more adjustments, to represent demographic features associated with the synthetic panelists that are to represent the respective return path data homes included in the return path data. Once demographic features are associated with the synthetic panelists, the audience measurement entity can then determine, from the return path data, synthetic respondent level data at the level of individual synthetic respondents (e.g., at the level of individual households, and the level of individual persons with the households, etc.). Synthetic respondent level data may include synthesized time records (e.g., at the quarter hour level, hour level, etc.) across a broadcasting day of viewing sessions associated with a return path data home and attributed to the synthetic respondent at the home level and/or at the level of individual synthetic family members and/or guests based on the demographic data associated with the synthetic respondent.

In some examples, the synthetic panelists created to represent the return path data include some demographic features, but are not associated (at least initially) with a particular geographic area, such as a county, a zip code, etc. For example, the return path data may include market-level designators, but may not provide geographic information for the return path data down to a desired level of granularity (e.g., granularity at the county level, the zip code level, etc.). Example methods, apparatus, systems and articles of manufacture (e.g., physical storage media) disclosed herein implement geographic location classification to assign synthetic respondents to geographic locations for audience measurement. As disclosed in further detail below, geographic location classification in accordance with the teachings of this disclosure assigns synthetic respondents to geographic locations based on values of demographic features of the synthetic respondents and aggregate values of demographic features known for the geographic locations. Furthermore, geographic location classification as disclosed herein can assign synthetic respondents to geographic locations when there is incomplete demographic information for the geographic locations (e.g., when the aggregate values of one or more of the demographic features are unknown/missing for one or more of the geographic locations, when aggregate values of a demographic feature for a combination of two or more geographic locations is known but the aggregate values for the individual geographic locations in the combination are unknown, etc.). As such, geographic location classification as disclosed herein can assign synthetic respondents, which represent return path data respondents, to geographic locations under a plethora of different audience measurement scenarios and at a level of geographic granularity not represented in the original return path data itself.

Turning to the figures, a block diagram of an example environment in which example return path data 100 and example meter data 102 are collected to generate synthetic respondent level data in which synthetic respondents are assigned to geographic locations in accordance with the teachings of this disclosure is illustrated in FIG. 1. The example environment of FIG. 1 includes the example return path data 100, the example meter data 102, an example media service provider 104, an example media presentation device 106, example media output devices 108, 110, an example local people meter (LPM) 112, and an example audience measurement entity (AME) 114. The example audience measurement entity 114 includes an example modeler 116, example return path data (RPD) audience storage 118, example panelist data storage 120, an example synthetic panel generator 122, example synthetic panel storage 126, and an example geographic location classifier 128.

The example media service provider 104 of FIG. 1 is a service provider (e.g., cable media service provider, a radio frequency (RF) media provider, a satellite media service provider, etc.) that presents media to an audience member via the example media presentation device 106. The media provided by the example media service provider 104 is transmitted (e.g., via a wired or wireless network connection) to the media presentation device 106. The media presentation device 106 is connected, via a wired or wireless connection, to the example media output device 108 to output the media to an audience member. The media output device 108 is a device capable of outputting the received media. For example, the media output device 108 may be a television, a radio, speakers, a projector, a computer, a computing device, a tablet, a mobile device, and/or any other device capable of outputting media.

When the example media presentation device 106 of FIG. 1 is on, the media presentation device 106 receives media corresponding to a station, program, website, etc., based on the tuning of the example media presentation device 106. For example, the media presentation device 106 may be a set-top box. Additionally or alternatively, the example media presentation device 106 may be an over-the-top device, a video game console, a digital video recorder (DVR), a digital versatile disc (DVD) player, a receiver, a router, a server, a computer, a mobile device, a smart television, and/or any device that receives media from a service provider. In some examples, the media presentation device 106 may implement a DVR and/or DVD player. In some examples, the example media presentation device 106 includes a unique serial number that, when associated with subscriber information, allows an audience measurement entity, a marketing entity, and/or any other entity to ascertain specific subscriber behavior information.

By way of example, the example media presentation device 106 may be tuned to channel 5. In such an example, the media presentation device 106 outputs media (from the example media service provider 104) corresponding to the tuned channel 5. The media presentation device 106 may gather tuning data corresponding to which channels, stations, websites, etc., that the example media presentation device 106 was tuned. The example media presentation device 106 generates and transmits the example return path data 100 to the example media service provider 104. The example return path data 100 includes the tuning data and/or other data corresponding to the example media service provider 104. Although the illustrated example of FIG. 1 includes the example media service provider 104 receiving the example return path data 100 from one media presentation device (e.g., the example media presentation device 106), at one location, corresponding to one media service provider (e.g., the example media service provider 104), the example media service provider 104 may receive return path data 100 (e.g., after post-processing, such as aggregation, obfuscation, etc., to remove personal identification information (PII) data) from any number or type(s) of media presentation devices, at any number of locations. The media service provider 104 transmits the collected return path data 100 to the example audience measurement entity 114. Additionally or alternatively, the audience measurement entity 114 may be hosted by any other entity or may be co-hosted by another entity(ies). For example, the return path data 100 may be collected from the example media presentation devices 106 by a media service provider (e.g., a cable television provider, a satellite television provider, etc.) and the example meter data 102 may be collected from an LPM (e.g., such as the example LPM 112) by the example audience measurement entity 114 cooperating with the media service provider to gain access to the tuning data. The example audience measurement entity 114 includes the example return path data audience storage 118 (e.g., a database) and the example panelist data storage 120 (e.g., a database).

The example media output device 110 of FIG. 1 is a device capable of outputting the received media. For example, the media output device 110 may be a television, a radio, speakers, a projector, a computer, a computing device, a tablet, a mobile device, and/or any other device capable of outputting media. In some examples, the media output device 110 receives media over-the-air. In this manner, the media output device 110 receives media via an antenna, which may not be limited to receiving media from just one media service provider. In the illustrated example of FIG. 1, the media output device 110 corresponds to one or more monitored panelists. The example LPM 112 monitors panelist exposure to media output by the example media output device 110. For example, the example LPM 112 is in communication with the example media output device 110 to collect and/or capture signals emitted externally by the media output device 110. The LPM 112 may be coupled with the media output device 110 via wired and/or wireless connection. The example LPM 112 may be implemented in connection with additional and/or alternative types of media presentation devices, such as, for example, a radio, a computer monitor, a video game console, and/or any other device capable to present media to a user. The LPM 112 may be a portable people meter, a cell phone, a computing device, a sensor, and/or any other device capable of metering (e.g., monitoring) user exposure to media. In some examples, a media presentation location may include a plurality of LPMs 112. In such examples, the plurality of the LPMs 112 may be used to monitor media exposure for multiple users and/or media output devices 110. Additionally, the example panelist data storage 120 receives and stores the example meter data 102 from the example LPM 112.

In some examples, the example LPM 112 of FIG. 1 includes a set of buttons assigned to audience members to determine which of the audience members is watching the example media output device 110. The LPM 112 may periodically prompt the audience members via a set of LEDs, a display screen, and/or an audible tone, to indicate that the audience member is present at a first media presentation location by pressing an assigned button. In some examples, to decrease the number of prompts and, thus, the number of intrusions imposed upon the media consumption experience of the audience members, the LPM 112 prompts only when unidentified audience members are located at the first media presentation location and/or only after the LPM 112 detects a channel change and/or a change in state of the media output device 110. In other examples, the LPM 112 may include at least one sensor (e.g., a camera, 3-dimensional sensor, etc.) and/or be communicatively coupled to at least one sensor that detects a presence of the user in a first example media presentation location. The example LPM 112 transmits the example meter data 102 to a media researcher and/or a marketing entity. The example meter data 102 includes the media presentation data (e.g., data related to media presented while the media output device 110 is on and a user is present). The example meter data 102 may further include a household identification, a tuner key, a presentation start time, a presentation end time, a channel key, etc. Although the illustrated example illustrates the example audience measurement entity 114 collecting the example meter data 102 from one LPM 112 at one location, the example audience measurement entity 114 may collect meter data from any number or type of meters at any number of locations.

The example return path data 100 (e.g., after post-processing) of FIG. 1 from the example media presentation device 106 and/or the example meter data 102 from the example LPM 112 is transmitted to the example audience measurement entity 114 via a network. The network may be implemented using any type of public or private network, such as, but not limited to, the Internet, a telephone network, a local area network (LAN), a cable network, and/or a wireless network. To enable communication via the network, the example media presentation device 106 includes a communication interface that enables a connection to an Ethernet, a digital subscriber line (DSL), a telephone line, a coaxial cable, or any wireless connection, etc.

The example modeler 116 of the example AME 114 of FIG. 1 collects the example return path data 100 corresponding to the example media presentation device(s) 106. As described above, the example return path data 100 includes tuning data of the example media presentation device 106. However, the example return path data 100 may not include specific data, such as demographic data, identifying any information relating to the audience of the example media output device 108. The example modeler 116 models such audience information. For example, the modeler 116 may implement any appropriate technique or combination of techniques to assign and/or model virtual users, also referred to as synthetic respondents, to augment the example return path data 100, thereby generating audience (e.g., viewer or listener) assigned return path data. The example modeler 116 outputs the audience assigned return path data to the example return path data audience storage 118.

The example synthetic panel generator 122 of FIG. 1 gathers (A) the audience assigned return path data from the example return path data audience storage 118, and (B) the example meter data 102 from the example panelist data storage 120 to determine, for example, the demographic features of the synthetic respondents assigned by the modeler 116 to the return path data. A synthetic panel is a group of synthetic respondents, also referred to as virtual panelists, created to represent the return path data homes included in the return path data 100. The synthetic panel enables respondent-level data to be generated from the return path data. In the illustrated example, the synthetic panel generator 122 initiates creation of the synthetic respondents for the synthetic panel by selecting monitored panelists to be representative of the demographics (e.g., viewer characteristics, income characteristics, etc.) of the unknown respondents (e.g., subscribers) corresponding to the return path data homes. For example, these monitored panelists may be selected from a panel (e.g., a national panel of metered users) based on a regional proximity to a designated market area from which the return path data is obtained, a similarity between demographics of the monitored panelists and demographics of the return path data audience location, household media characteristics (e.g., how the households receive television signals (cable, satellite, over-the-air radio, etc.)), a similarity between media exposure characteristics of the monitored panelists and the return path data audience, etc. The example synthetic panel generator 122 then assigns demographics features of the selected monitored panelists to the synthetic respondents and stores this synthetic respondent data in the example synthetic panel storage 126.

As noted above, in some examples, the synthetic respondents created by the synthetic panel generator 122 to represent the return path data 100 include some demographic features, but are not associated (at least initially) with a particular geographic area, such as a county, a zip code, etc. For example, the return path data 100 may include market-level designators, but may not provide geographic information for the return path data 100 down to the desired level of granularity (e.g., granularity at the county level, the zip code level, etc.). As such, the audience measurement entity 114 of the illustrated example includes the example geographic location classifier 128 to assign synthetic respondents to geographic locations for audience measurement. As disclosed in further detail below, the example geographic location classifier 128 assigns synthetic respondents to geographic locations based on constraints constructed from values of demographic features of the synthetic respondents and aggregate values of demographic features known for the geographic locations. In the illustrated example, the geographic locations, constraints and aggregate values of the demographic features for the geographic locations are specified in example configuration data 130 provided to the geographic location classifier 128. As disclosed in further detail below, in some examples, the geographic location classifier 128 can assign synthetic respondents to geographic locations when there is incomplete demographic information for the geographic locations (e.g., when the aggregate values of one or more of the demographic features are unknown/missing for one or more of the geographic locations, when aggregate values of a demographic feature for a combination of two or more geographic locations is known but the aggregate values for the individual geographic locations in the combination are unknown, etc.).

Figure 2:
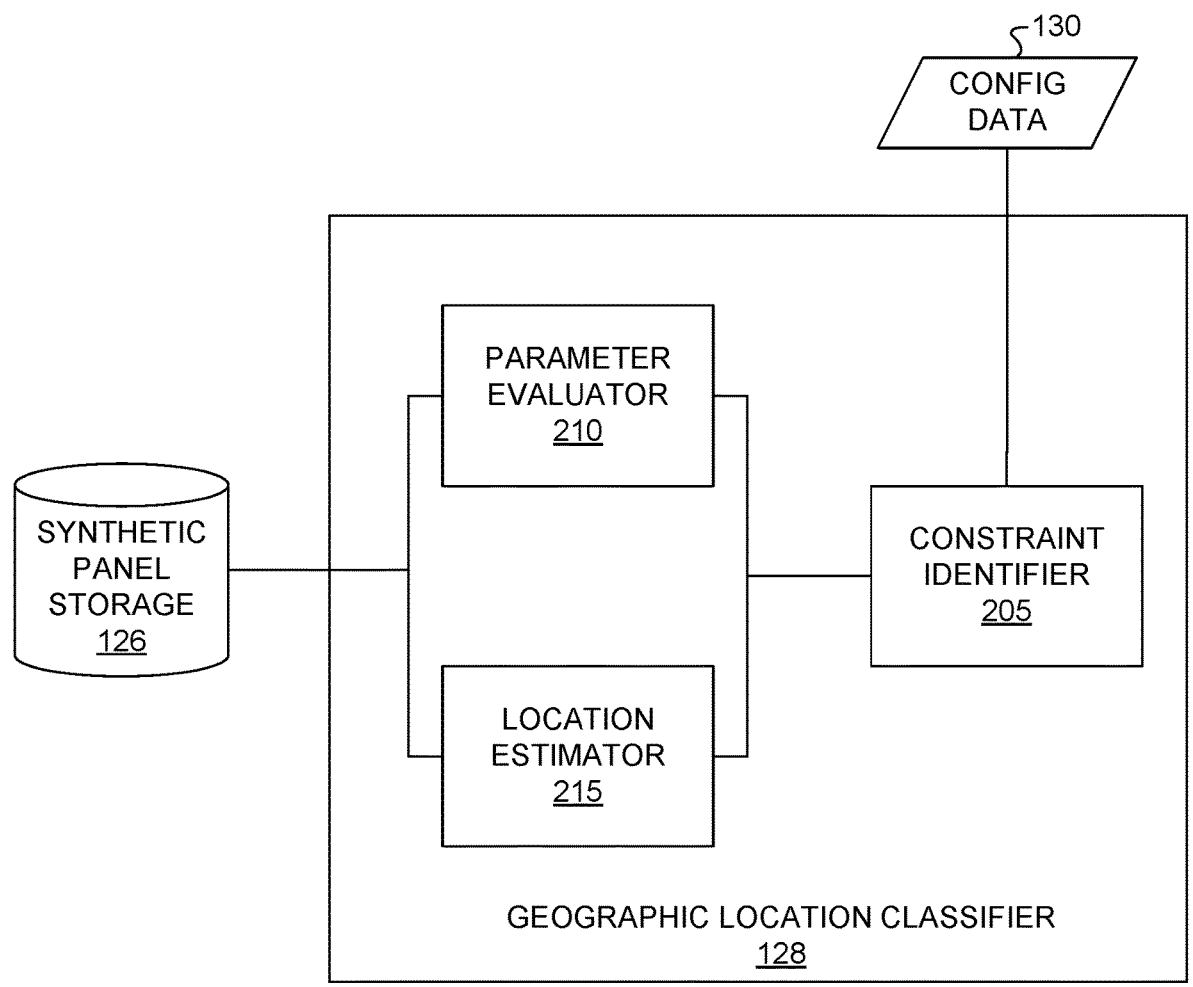
FIG. 2 is a block diagram of an example geographic location classifier that may be included in the example environment of FIG. 1 to assign synthetic respondents to geographic locations for audience measurement in accordance with the teachings of this disclosure.

A block diagram of example implementation of the geographic location classifier 128 of FIG. 1 is illustrated in FIG. 2. The example geographic location classifier 128 of FIG. 2 includes an example constraint identifier 205, an example parameter evaluator 210 and an example location estimator 215. The constraint identifier 205 of the illustrated example determines a set of constraints based on aggregate values of demographic features associated with geographic locations to which the geographic location classifier 128 is to assign synthetic respondents created and stored in the synthetic panel storage 126. For example, the set of possible geographic locations to which the synthetic panelists can be assigned, the aggregate values of demographic features associated with geographic locations, and/or the constraints may be specified in the example configuration data 130 downloaded or otherwise provided to the geographic location classifier 128. Example of constraints are described in further detail below.

The parameter evaluator 210 of the illustrated example determines a set of parameters of a model that is to return probabilities that respective ones of the synthetic respondents are associated with the respective ones of the geographic locations specified in the configuration data 130. As described in further detail below, respective ones of the parameters are associated with respective ones of the constraints specified in the configuration data 130. In some examples, the parameter evaluator 210 determines the set of parameters based on the aggregate values of the demographic features specified in the configuration data 130 for respective ones of the geographic locations, and values of the demographic features retrieved from the synthetic panel storage 126 for respective ones of the synthetic respondents.

After the set of model parameters is determined, the location estimator 215 of the illustrated example evaluates the model using the set of determined model parameters to assign respective ones of the synthetic respondents to the geographic locations. For example, and as disclosed in further detail below, for a given one of the synthetic respondents, the location estimator 215 evaluates the model based on the determined set of model parameters and values of the demographic features retrieved from the synthetic panel storage 126 for the given synthetic respondent to determine a set of probabilities, which may be referred to as assignment probabilities, that the given synthetic respondent is to be assigned to respective ones of the geographic locations. In the illustrated example, the location estimator 215 stores the set of assignment probabilities determined for the given synthetic respondent in the synthetic panel storage 126 to provide these assignment probabilities to the audience measurement entity 114 to enable audience measurement to be performed based on the return path data 100. In some examples, the sets of assignment probabilities determined for the respective synthetic respondents represent the assignment of the synthetic respondents to the different geographic locations (e.g., such as when the assignment does not need to be binary but may be represented as a likelihood that a given synthetic respondent is to be associated with a given geographic location). In some examples, the location estimator 215 further processes the sets of assignment probabilities determined for the respective synthetic respondents using any appropriate technique to assign each synthetic respondent to a single geographic location.

In some examples, the model evaluated by the location estimator 215 is an example conditional maximum entropy model given by Equation 1, which is:

$$p_\lambda(k \mid i) = \frac{1}{Z_\lambda(i)} \exp\left(\sum_j \lambda_{(k,j)} f(i, j)\right) \quad \text{Equation 1}$$

The conditional maximum entropy model of Equation 1 returns the set of assignment probabilities, represented by $p_\lambda(k|i)$, for the synthetic respondents. In Equation 1, the index i=1, ..., N represents N synthetic respondents (e.g., which may represent virtual individuals, households, etc.) that are to be assigned to geographic locations. In Equation 1, the index j=1, ..., M represents M demographic features (e.g., age, gender, household size, income, etc.) assigned or otherwise associated with each one of the synthetic respondents. In Equation 1, the j=1, ..., M demographic features for a given synthetic respondent i are represented by the term f(i,j), which corresponds to the $j^{th}$ feature of the $i^{th}$ respondent. In Equation 1, the index k=1, ..., K represents the K geographic regions to which the synthetic respondents may be assigned.

The term $\lambda_{(i,j)}$ of Equation 1 represents the set of parameters (also referred to as the set of model parameters) to be determined by the example parameter evaluator 210. As described in further detail below, the parameters $\lambda_{(i,j)}$ correspond respectively to the constraints specified in the configuration data 130 and are used by the model to ensure the constraints (e.g., which are based on the aggregate values of the demographics features specified for the geographic locations) are met. These parameters may also be referred to as Lagrange multipliers. The term $Z_{(\lambda)}(i)$ of Equation 1 is referred to as a partition function for the $i^{th}$ synthetic respondent and acts as a normalization term in the model. The partition function $Z_{(\lambda)}(i)$ for the $i^{th}$ synthetic respondent is given by Equation 2, which is:

$$Z_\lambda(i) = \sum_k \exp\left(\sum_j \lambda_{(k,j)} f(i, j)\right) \quad \text{Equation 2}$$

To determine the parameters $\lambda_{(i,j)}$, the parameter evaluator 210 of the illustrated example constructs and evaluates an optimization function given by Equation 3:

$$\Psi(\lambda) = \sum_i \log Z_\lambda(i) - \sum_{(k,j)} \lambda_{(k,j)} C(k, j) \quad \text{Equation 3}$$

The optimization function $\psi(\lambda)$ of Equation 3 is a combination of two functions constructed by the parameter evaluator 210. The first function, $\Sigma_i \log Z_\lambda(i)$, combines, based on the set of parameters $\lambda$, the values of the demographic features for the respective ones of the respondents (see Equation 2). The second function, $\Sigma_{(k,j)} \lambda_{(k,j)} C(k,j)$, combines, based on the set of parameters $\lambda$, the aggregate values of the demographic features associated with the respective ones of the geographic locations. In Equation 3, the aggregate value of the $j^{th}$ feature for the $k^{th}$ geographic location is represented by the term C(k,j). As noted above, the aggregate values of the demographic features, C(k,j), are specified in the configuration data 130 and may be determined from, for example, a training data set, third party data sources, and/or any other appropriate technique or combination of techniques.

In some examples, the parameter evaluator 210 determines the values of the set of model parameters $\lambda$ to be a set of parameter values $\lambda^*$ that minimizes the optimization function $\psi(\lambda)$ of Equation 3. In other words, the parameter evaluator 210 determines set of parameter values $\lambda^*$ to solve the unconstrained dual optimization problem represented by Equation 4, which is:

$$\text{Find } \lambda^* = \underset{\lambda}{\text{argmin}} \, \Psi(\lambda) \quad \text{Equation 4}$$

For example, the parameter evaluator 210 can find the set of parameter values $\lambda^*$ using an iterative, numerical techniques and/or any other appropriate solution-finding technique. Once the set of parameter values $\lambda^*$ is determined, the location estimator 215 uses these parameter values in the conditional maximum entropy model of Equation 1 to determine the set of assignment probabilities, $p_\lambda(k|i)$, for the synthetic respondents.

Examples of demographic features, conditions and model parameters that may be used by the example geographic location classifier 128 of FIGS. 1 and/or 2 to assign synthetic respondents to geographic locations for audience measurement in accordance with the teachings of this disclosure are illustrated in FIGS. 3-5. The example of FIG. 3 includes Table 305, which lists values of example demographic features, represented by F1 through F4 in the table, for a group of synthetic respondents, represented by Person 1 through Person 6 in the table. The example of FIG. 3 also includes Table 310, which lists aggregate values of the demographic features F1 through F4 for a group of geographical locations, represented by Class 1 and Class 2 in the table. The example of FIG. 3 also includes Table 315, which lists the model parameters $\lambda$ to be included in the model constructed by the geographic location classifier 128 in accordance with Equation 1.

In the illustrated example of FIG. 3, each of the aggregate demographic feature values F1 through F4 listed in Table 310 for the geographical locations Class 1 and Class 2 is a constraint to be satisfied by the geographic location classifier 128 of FIG. 2 when assigning the synthetic respondents to the geographic locations. Accordingly, Table 315 of FIG. 3 includes a model parameter corresponding to each one of the aggregate demographic feature values F1 through F4 listed in Table 310 for the geographical locations Class 1 and Class 2. Table 315 of FIG. 3 also includes a model parameter corresponding to the number of respondents to be assigned to each geographic location, which is the Number feature listed in Table 310. To represent the contribution of each synthetic panelist to this Number feature, Table 305 includes a corresponding feature F0 representing a weight of each synthetic panelist. In the illustrated example of FIG. 3, the weight of each panelist is 1 indicating that each synthetic panelist contributes equally to the geographic assignment. However, in other examples, the weights of one or more of the synthetic panelists can be a value other than 1 to adjust the contributions of different synthetic panelists to the geographical assignment performed by the geographic location classifier 128.

For the example of FIG. 3, the example parameter evaluator 210 of the geographic location classifier 128 determines the model parameters listed in Table 315 using the optimization function $\psi(\lambda)$ of Equation 3. As noted above, the optimization function ψ(λ) is a combination of two functions. The first function is based on the partition function $Z_{(λ)}(i)$ given by Equation 2. The second function is based on the aggregate values of the demographic features, C(k,j), which in the example of FIG. 3 correspond respectively to the constraints.

Because the example of FIG. 3 includes two possible geographical location classifications, the partition function $Z_{(λ)}(i)$ for each synthetic respondent includes two parts. For example, the partition function $Z_{(λ)}(3)$ for respondent 3, also denoted as Z(3), is given by Equation 5, which is:

$$Z_3 = \exp(λ_{(1,0)} + 5λ_{(1,1)} + 5λ_{(1,2)} + 9λ_{(1,3)} + 10λ_{(1,4)}) + \exp(λ_{(2,0)} + 5λ_{(2,1)} + 5λ_{(2,2)} + 9λ_{(2,3)} + 10λ_{(2,4)})$$  Equation 5

In Equation 5, the coefficients multiplying the respective model parameters correspond to the values of the respective demographic features listed in Table 3 for respondent 3. Thus, for the example of FIG. 3, the contribution of respondent 3 to the first function of the optimization function ψ(λ) constructed by the parameter evaluator 210 according to Equation 3 is a linear combination of the values of the demographic features for respondent 3 in which respective ones of the values of the demographic features for respondent 3 are multiplied by respective ones of the set of model parameters.

Referring to Equation 3, the second function of the optimization function ψ(λ) constructed by the parameter evaluator 210 for the example of FIG. 3 is given by Equation 6, which is:

$$\sum_{(k,j)} λ_{(k,j)} C(k, j) = λ_{(1,0)} * 3 + λ_{(1,1)} * 13 + \cdots + λ_{(2,4)} * 4$$  Equation 6

Thus, for the example of FIG. 3, the second function of the optimization function ψ(λ) constructed by the parameter evaluator 210 according to Equation 3 includes a linear combination of the aggregate values of the demographic features associated with the first geographic location (Class 1) in which respective ones of the aggregate values of the demographic features for the first geographic location are multiplied by respective ones of the set of model parameters. The second function also includes a linear combination of the aggregate values of the demographic features associated with the second geographic location (Class 2) in which respective ones of the aggregate values of the demographic features for the second geographic location are multiplied by respective ones of the set of model parameters.

As described above, the parameter evaluator 210 determines the values of the set of model parameters listed in Table 315 to minimize the optimization function ψ(λ) which, in the example of FIG. 3, is constructed to be a combination of a first function including expressions corresponding to Equation 5 for each respondent, and a second function corresponding to Equation 6. After the parameter evaluator 210 determines the values of the set of model parameters listed in Table 315, the location estimator 215 uses these parameter values in the conditional maximum entropy model of Equation 1 to determine the set of assignment probabilities, $p_λ(k|i)$, for assigning the synthetic respondents listed in Table 305 to the geographic locations listed in Table 310.

The example of FIG. 4 corresponds to a scenario in which the aggregate values of one or more of the demographic features are unknown/missing for one or more of the geographic locations. The example of FIG. 4 assumes the group of synthetic respondents to be assigned to the geographic locations corresponds to Table 305 of FIG. 3. The example of FIG. 4 includes Table 410, which lists, for the geographical locations represented by Class 1 and Class 2, the aggregate values of just a subset of the demographic features F1 through F4, namely, the aggregate value of feature F2 (e.g., 16) for geographic location Class 1, and the aggregate value of feature F1 (e.g., 25) for geographic location Class 2. Thus, in the example of FIG. 4, the aggregate values are missing for features F1, F3 and F4 for geographic location Class 1, for features F2, F3 and F4 for geographic location Class 2, and for the Numbers feature for both locations.

The example of FIG. 4 also includes Table 415, which lists the model parameters λ to be included in the model constructed by the geographic location classifier 128 in accordance with Equation 1. In the illustrated example of FIG. 4, the constraints to be satisfied by the geographic location classifier 128 of FIG. 2 when assigning the synthetic respondents to the geographic locations are limited to the available aggregate feature values listed in Table 410. Thus, Table 415 includes just the model parameters corresponding to the available aggregate feature values listed in Table 410, namely, $λ_{(1,2)}$ corresponding to feature F2 for geographic location Class 1, and $λ_{(2,1)}$ corresponding to feature F1 for geographic location Class 2. The other model parameters are omitted (e.g., are set to zero).

For the example of FIG. 4, the example parameter evaluator 210 of the geographic location classifier 128 determines the model parameters listed in Table 415 using the optimization function ψ(λ) of Equation 3. As noted above, the optimization function ψ(λ) is a combination of two functions. The first function is based on the partition function $Z_{(λ)}(i)$ given by Equation 2. For instance, the example of FIG. 4, the partition function $Z_{(λ)}(2)$ for respondent 2, also denoted as Z(2), is given by Equation 7, which is:

$$Z_2 = \exp(7λ_{(1,2)}) + \exp(8λ_{(2,1)})$$  Equation 7

As can be seen from Equation 7, in the example of FIG. 4, the partition function for each respondent includes only the model parameters corresponding to the specified constraints, which in this example are the available aggregate feature values for the geographic locations. Thus, for the example of FIG. 4, the contribution of respondent 2 to the first function of the optimization function ψ(λ) constructed by the parameter evaluator 210 according to Equation 3 is a linear combination of the values of a subset of the demographic features for respondent 2 corresponding to just the available aggregate feature values for the geographic locations.

In the example of FIG. 4, the second function in the optimization function ψ(λ) is based on the available aggregate feature values, C(k,j), for the geographic locations, which in the example of FIG. 4 correspond respectively to the constraints. Referring to Equation 3, the second function of the optimization function ψ(λ) constructed by the parameter evaluator 210 for the example of FIG. 4 is given by Equation 8, which is:

$$\sum_{(k,j)} λ_{(k,j)} C(k, j) = λ_{(1,2)} * 16 + λ_{(2,1)} * 25$$  Equation 8

Thus, for the example of FIG. 3, the second function of the optimization function ψ(λ) constructed by the parameter evaluator 210 according to Equation 3 includes a linear combination of just the available aggregate feature values for the geographic locations.

As described above, the parameter evaluator 210 determines the values of the set of model parameters listed in Table 315 to minimize the optimization function $\psi(\lambda)$ which, in the example of FIG. 4, is constructed to be a combination of a first function including expressions corresponding to Equation 7 for each respondent, and a second function corresponding to Equation 8. For the example of FIG. 4, the solution for the set of model parameters is $\lambda_{(1,2)}=251.94$ and $\lambda_{(2,1)}=231.769$. The location estimator 215 can then use these parameter values in the conditional maximum entropy model of Equation 1 to determine the set of assignment probabilities, $p_\lambda(k|i)$, for assigning the synthetic respondents listed in Table 305 to the geographic locations listed in Table 410.

The example of FIG. 5 corresponds to a scenario in which the aggregate values of one or more of the demographic features are unknown/missing for one or more of the geographic locations, and are completely unknown for one or more of the geographic locations. The example of FIG. 5 assumes the group of synthetic respondents to be assigned to the geographic locations corresponds to Table 305 of FIG. 3. The example of FIG. 5 includes Table 415, which lists the model parameters $\lambda$ to be included in the model constructed by the geographic location classifier 128 in accordance with Equation 1. In the illustrated example of FIG. 5, the constraints to be satisfied by the geographic location classifier 128 of FIG. 2 when assigning the synthetic respondents to the geographic locations are limited to just a subset of the demographic features F1 through F4 for some of the geographic locations, namely, the aggregate values of features F2 and F4 for geographic location Class 1, and the aggregate values of features F1 and F3 for geographic location Class 2. Furthermore, there is a third geographic location, Class 3, for which no aggregate feature values are available. Thus, Table 515 includes just the model parameters corresponding to the available aggregate feature values, namely, $\lambda_{(1,2)}$ and $\lambda_{(1,4)}$ corresponding to features F2 and F4 for geographic location Class 1, and $\lambda_{(2,1)}$ and $\lambda_{(2,1)}$ corresponding to features F1 and F3 for geographic location Class 2. The other model parameters, including all parameters for geographic location Class 3, are omitted (e.g., are set to zero).

For the example of FIG. 5, the partition function $Z_{(\lambda)}(1)$ for respondent 1, also denoted as $Z(1)$, is given by Equation 9, which is:

$$Z_1 = \exp(2\lambda_{(1,2)} + 10\lambda_{(1,4)}) + \exp(1\lambda_{(2,1)} + 8\lambda_{(2,3)} + 10\lambda_{(2,4)}) + \exp(0) \quad \text{Equation 9}$$

The third term in Equation 9 has no model parameters as no information is known about the third geographic location, Class 3. However, the third geographic location classification exists, so the expression simplifies to $\exp(0)=1$, a constant.

Another example supported by the geographic location classifier 128 is the scenario in which aggregate values of a given demographic feature are unknown/missing for multiple geographic locations, but the aggregate value of a linear combination of this unknown/missing demographic feature is known for the combination of these geographic locations. For example, in the example of FIG. 5, assume the individual aggregate values of the fourth feature, F4, are unknown for the first and second geographical locations, Class 1 and Class 2, but the total aggregate value of the feature F4 across both geographic locations is known. In such an example, the two model parameters $\lambda_{(1,4)}$ and $\lambda_{(2,4)}$ reduce to a single model parameter, $\lambda_{(1+2,4)}$. The partition function $Z_{(\lambda)}(i)$ is modified to incorporate that union, as well. For example, the partition function $Z_{(\lambda)}(1)$, also denoted as $Z(1)$, for respondent 1 in Table 305 for this example is given by Equation 10, which is:

$$Z_1 = \exp(2\lambda_{(1,2)} + 10\lambda_{(1+2,4)}) + \exp(1\lambda_{(2,1)} + 8\lambda_{(2,3)} + 10\lambda_{(1+2,4)}) + \exp(0) \quad \text{Equation 10}$$

An example classification operation performed by the example geographic location classifier 128 of FIGS. 1 and/or 2 to assign synthetic respondents to geographic locations for audience measurement in accordance with the teachings of this disclosure is illustrated in FIG. 6. The example of FIG. 6 includes Table 605, which lists values of example demographic features, represented by D1 through D3 in the table, for a group of synthetic respondents, represented by households H1 through H11 in the table. The example of FIG. 6 also includes Table 610, which lists aggregate values of the demographic features D1 through D3 for a group of geographical locations, represented by counties C1 through C5 in the table. Thus, in the example of FIG. 6, the geographic location classifier 128 is to assign N=10 synthetic respondents (e.g., households) each having M=3 demographic features to K=5 geographic locations (e.g., counties). In a more typical example corresponding to a small designated market area (DMA), the geographic location classifier 128 may need to assign N=700 synthetic households each having M=20 demographic features to K=30 counties. Other DMAs may have even larger numbers of households and/or counties.

In the illustrated example of FIG. 6, each of the aggregate demographic feature values D1 through D3 listed in Table 610 for the geographical locations C1 through C5 is a constraint to be satisfied by the geographic location classifier 128 of FIG. 2 when assigning the synthetic respondents H1 through H10 to the geographic locations C1 through C5. As described above, the example parameter evaluator 210 of the geographic location classifier 128 determines the model parameters $\lambda_{(i,j)}$ of the model in Equation 1 by constructing and evaluating the optimization function in Equation 3 using the feature values listed in Tables 605 and 610. After the parameter evaluator 210 determines the values of the set of model parameters $\lambda_{(i,j)}$, the example location estimator 215 of the geographic location classifier 128 uses these parameter values in the model of Equation 1 to determine the set of assignment probabilities, $p_\lambda(k|i)$, for assigning the synthetic respondents listed in Table 605 to the geographic locations listed in Table 610. The example of FIG. 6 includes Table 620, which lists the respective sets of assignment probabilities, $p_\lambda(k|i)$, determined by the location estimator 215 in this example. As shown by Table 620, the location estimator 215 estimates a 69% likelihood that the synthetic respondent H2 belongs in the geographic location C4, and a 100% likelihood that the synthetic respondent H4 belongs in the geographic location C5. Furthermore, because the other assignment probabilities for geographic location C5 are zero, the location estimator 215 estimates that the synthetic respondent H4 is the only respondent assigned to geographic location C5. As further illustrated in Table 620, the assignment probabilities, $p_\lambda(k|i)$, for a given synthetic respondent sum to 100%.

Although the example geographic location classifier 128 of FIG. 2 has been described in the context of assigning synthetic respondents to geographic locations, use of the geographic location classifier 128 is not limited thereto. For example, the geographic location classifier 128 can be adapted to classify any set of items characterized by values of features to a set of possible classes. To perform such classification, the indices of the example model of Equation 1 and subsequent equations can be modified such that the index i=1, . . . , N represents the N items that are to be assigned to the different possible classes, the index j=1, . . . , M represents the M features associated with each one of the items, and the index k=1, . . . , K represents the K classes to which the items may be assigned.

While an example manner of implementing the geographic location classifier 128 of FIG. 1 is illustrated in FIG. 2, one or more of the elements, processes and/or devices illustrated in FIG. 2 may be combined, divided, re-arranged, omitted, eliminated and/or implemented in any other way. Further, the example constraint identifier 205, the example parameter evaluator 210, the example location estimator 215 and/or, more generally, the example geographic location classifier 128 of FIG. 2 may be implemented by hardware, software, firmware and/or any combination of hardware, software and/or firmware. Thus, for example, any of the example constraint identifier 205, the example parameter evaluator 210, the example location estimator 215 and/or, more generally, the example geographic location classifier 128 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example geographic location classifier 128, the example constraint identifier 205, the example parameter evaluator 210 and/or the example location estimator 215 is/are hereby expressly defined to include a non-transitory computer readable storage device or storage disk such as a memory, a digital versatile disk (DVD), a compact disk (CD), a Blu-ray disk, etc. including the software and/or firmware. Further still, the example geographic location classifier 128 may include one or more elements, processes and/or devices in addition to, or instead of, those illustrated in FIG. 2, and/or may include more than one of any or all of the illustrated elements, processes and devices.

Figure 7:
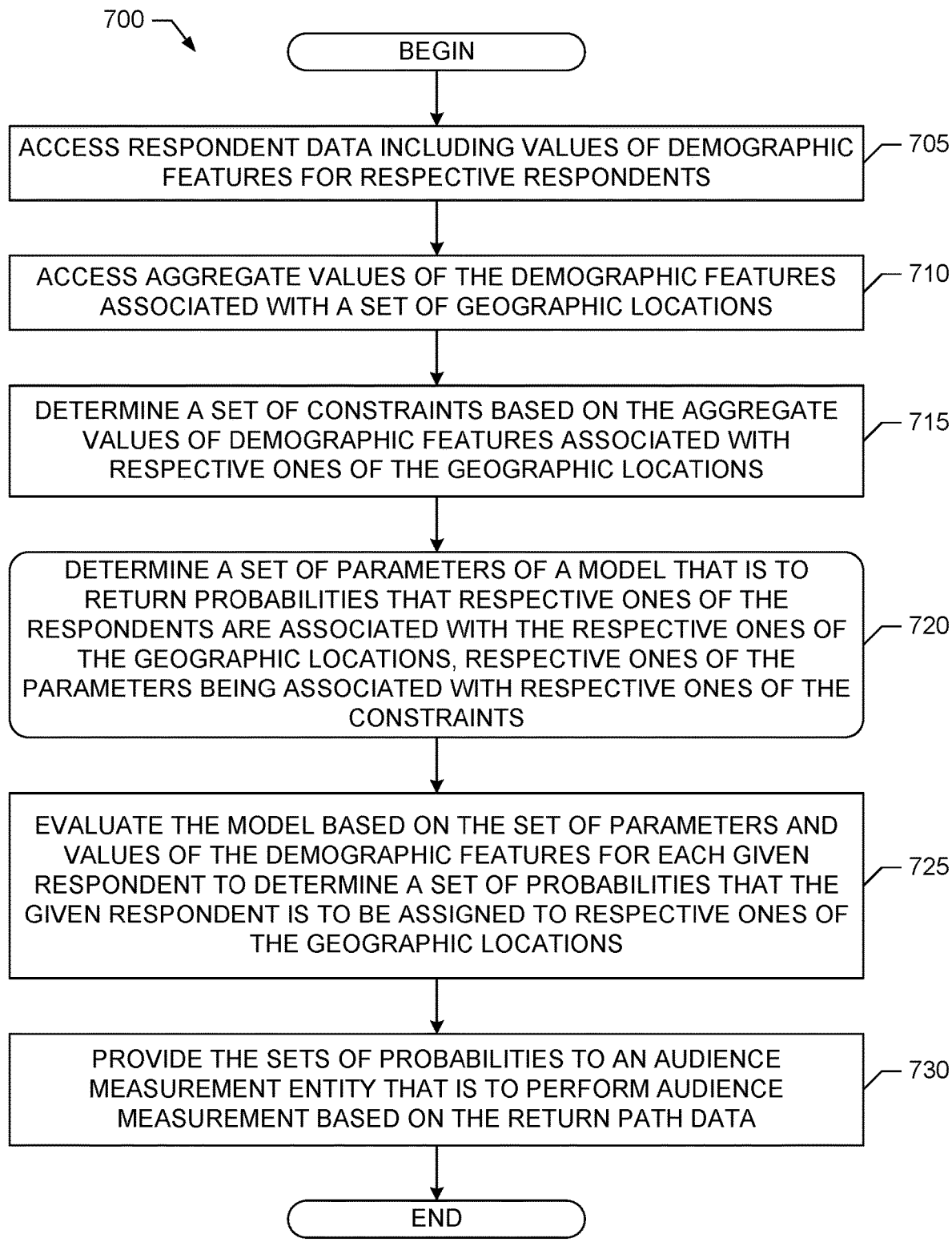
FIGS. 7-8 are flowcharts representative of example computer readable instructions that may be executed to implement the example geographic location classifier of FIG. 2.
Figure 8:
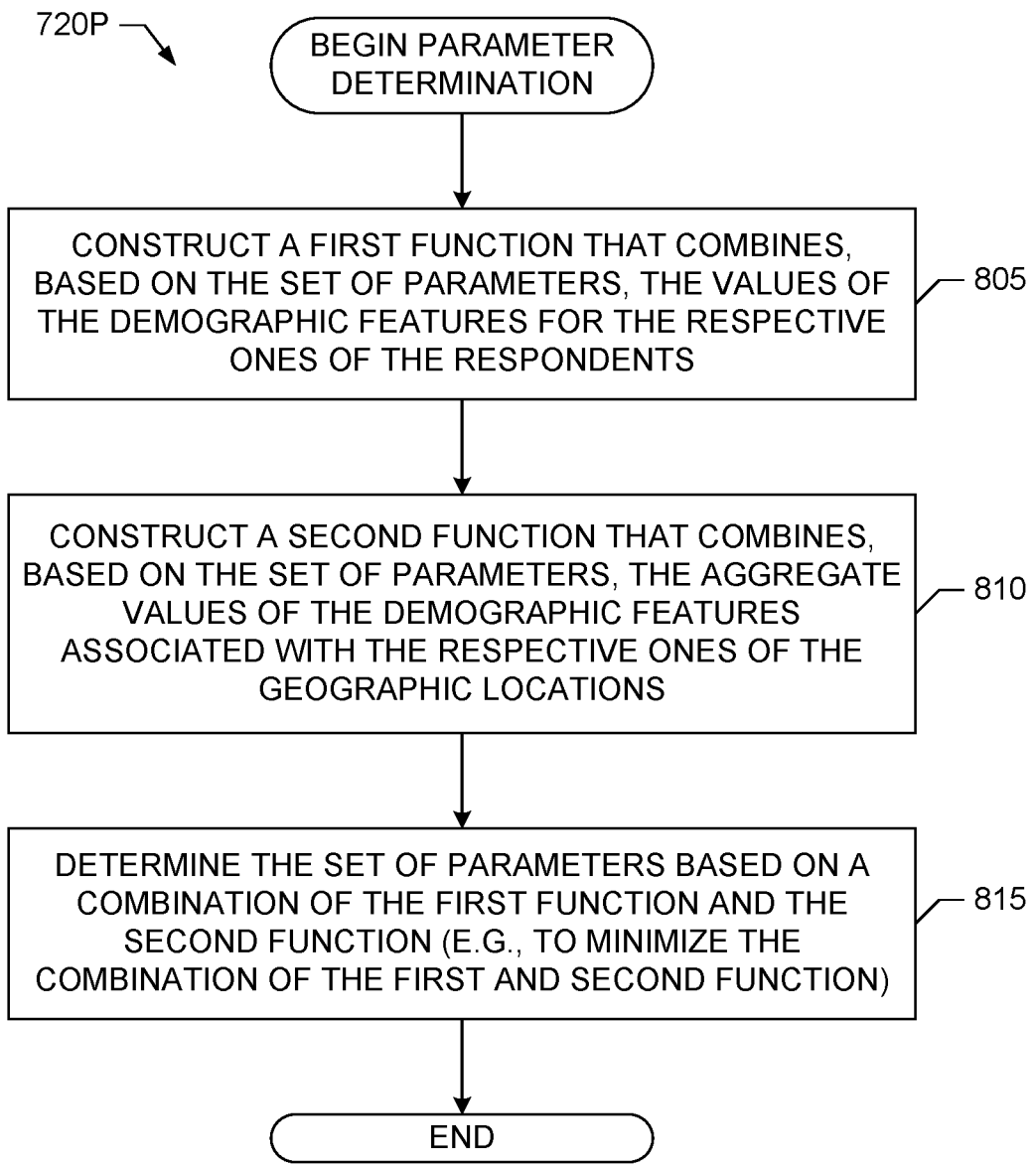

Flowcharts representative of example machine readable instructions for implementing the example geographic location classifier 128 of FIGS. 1 and/or 2 are shown in FIGS. 7-8. In these examples, the machine readable instructions comprise one or more programs for execution by a processor, such as the processor 912 shown in the example processor platform 900 discussed below in connection with FIG. 9. The one or more programs, or portion(s) thereof, may be embodied in software stored on a non-transitory computer readable storage medium such as a CD-ROM, a floppy disk, a hard drive, a digital versatile disk (DVD), a Blu-ray Disk™, or a memory associated with the processor 912, but the entire program or programs and/or parts thereof could alternatively be executed by a device other than the processor 912 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 7-8, many other methods of implementing the example geographic location classifier 128 may alternatively be used. For example, with reference to the flowcharts illustrated in FIGS. 7-8, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 7-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Also, as used herein, the terms "computer readable" and "machine readable" are considered equivalent unless indicated otherwise.

An example program 700 that may be executed to implement the example geographic location classifier 128 of FIGS. 1 and/or 2 is represented by the flowchart shown in FIG. 7. With reference to the preceding figures and associated written descriptions, the example program 700 of FIG. 7 begins execution at block 705 at which the example parameter evaluator 210 and the example location estimator 215 of the geographic location classifier 128 access synthetic respondent data from, for example, the synthetic panel storage 126. The synthetic respondent data indicates the synthetic respondents that are to be assigned by the geographic location classifier 128 to geographic locations, and includes values of demographic features for the synthetic respondents. At block 710, the example constraint identifier 205 of the geographic location classifier 128 accesses the configuration data 130, which specifies the geographic locations to which the synthetic respondents are to be assigned, and aggregate values of demographic features associated with the geographic locations. At block 715, the constraint identifier 205 further determines, as described above, a set of constraints, which are based on the aggregate values of demographic features associated with the geographic locations. For example, the constraint identifier 205 may determine the constraints from the configuration data 130.

At block 720, the parameter evaluator 210 determines, as described above, a set of parameters for a model, such as the example model of Equation 1, that is to return probabilities that respective ones of the synthetic respondents are associated with respective ones of the geographic locations. As described above, respective ones of the constraints determined at block 720 are associated with respective ones of the constraints determined at block 715. An example program that may be executed to implement the processing at block 720 is illustrated in FIG. 8, which is described in further detail below.

At block 725, the location estimator 215 is to evaluate, as described above, the model, such as the example model of Equation 1, for each given synthetic respondent based on the set of parameters determined at block 720 and values of the demographic features for the given synthetic respondent to determine a set of probabilities that the given synthetic respondent is to be assigned to respective ones of the geographic locations. At block 730, the location estimator 215 provides the sets of assignment probabilities determined at block 725 for the respective synthetic respondents to the audience measurement entity 114 (e.g., by storing the sets of probabilities in the synthetic panel storage 126).

An example program 720P that may be executed to perform the processing at block 720 of FIG. 7, and/or to implement the example parameter evaluator 210 of FIG. 2, is illustrated in FIG. 8. With reference to the preceding figures and associated written descriptions, the example program 720P of FIG. 8 begins execution at block 805 at which the parameter evaluator 210 constructs, as described above, a first function (e.g., $\Sigma_i \log Z_\lambda(i)$ of Equation 3) that combines, based on the set of model parameters, the values of the demographic features for the respective ones of the respondents. At block 810, the parameter evaluator 210 constructs, as described above, a second function (e.g., $\Sigma_{(k,j)} \lambda_{(k,j)} C(k,j)$ of Equation 3) that combines, based on the set of model parameters, the aggregate values of the demographic features associated with the respective ones of the geographic locations. At block 815, the parameter evaluator 210 determines the set of model parameters based on a combination of the first function and the second function (e.g., the optimization function $\psi(\lambda)$ of Equation 3). For example, the parameter evaluator 210 determines the model parameters to minimize the combination of the first function and the second function, as described above.

Figure 9:
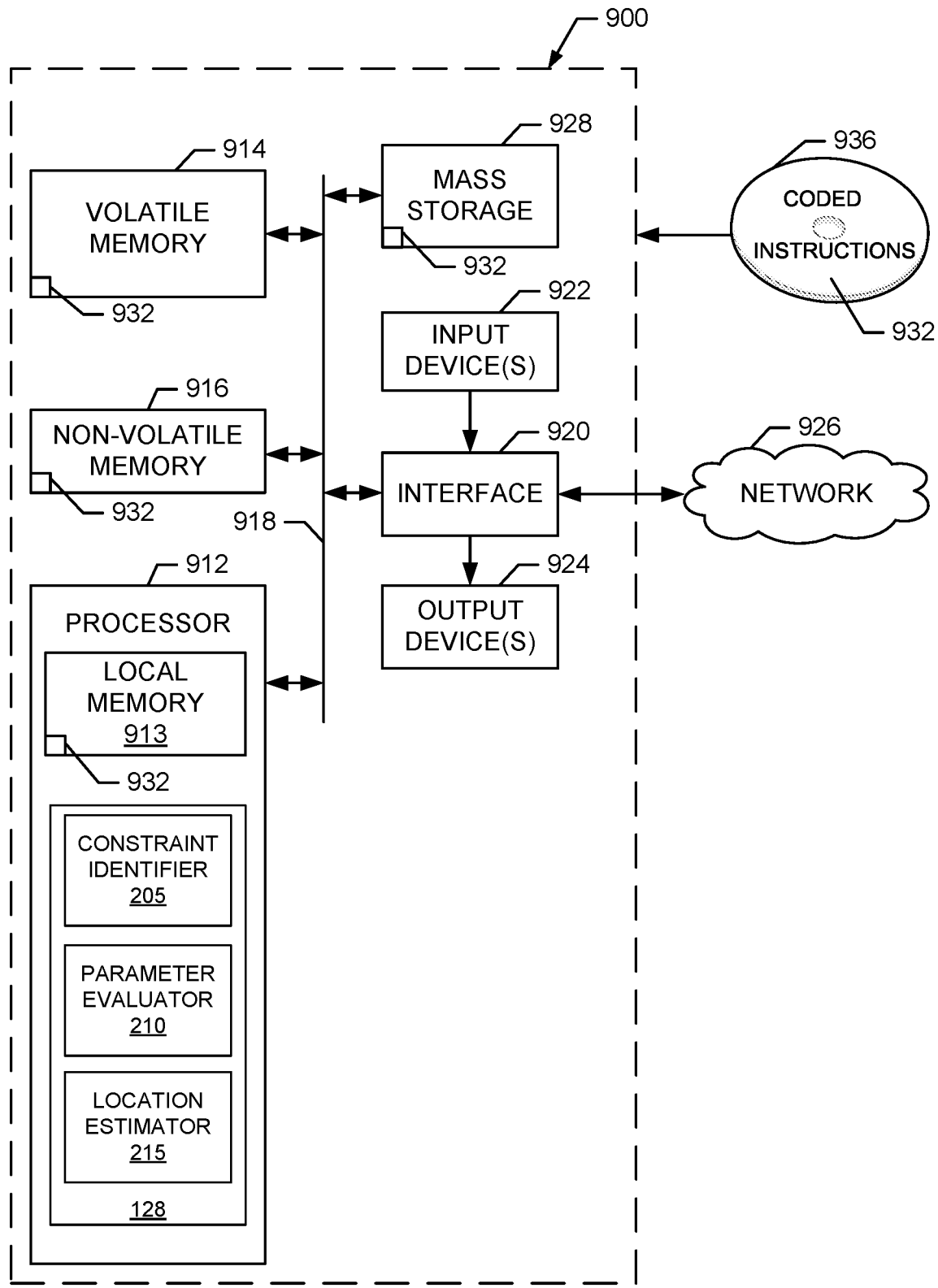
FIG. 9 is a block diagram of an example processor platform structured to execute the example computer readable instructions of FIGS. 7 and/or 8 to implement the example geographic location classifier of FIG. 2.

FIG. 9 is a block diagram of an example processor platform 900 structured to execute the instructions of FIGS. 7 and/or 8 to implement the example geographic location classifier 128 of FIGS. 1 and/or 2. The processor platform 900 can be, for example, a server, a personal computer, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor 912 may be a semiconductor based (e.g., silicon based) device. In this example, the processor 912 implements the example constraint identifier 205, the example parameter evaluator 210 and the example location estimator 215.

The processor 912 of the illustrated example includes a local memory 913 (e.g., a cache). The processor 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 900, can allow the user to control the computer system and provide data to the computer using physical gestures, such as, but not limited to, hand or body movements, facial expressions, and face recognition.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID (redundant array of independent disks) systems, and digital versatile disk (DVD) drives. In some examples, the mass storage device 930 may implement the example RPD audience storage 118, the example panelist data storage 120 and/or the example synthetic panel storage 126. Additionally or alternatively, in some examples the volatile memory 918 may implement the example RPD audience storage 118, the example panelist data storage 120 and/or the example synthetic panel storage 126.

Coded instructions 932 corresponding to the instructions of FIGS. 7 and/or 8 may be stored in the mass storage device 928, in the volatile memory 914, in the non-volatile memory 916, in the local memory 913 and/or on a removable tangible computer readable storage medium, such as a CD or DVD 936.

From the foregoing, it will be appreciated that example methods, apparatus and articles of manufacture have been disclosed that implement geographic location classification to assign synthetic respondents to geographic locations for audience measurement. In some audience measurement examples, synthetic panelists are created to represent the return path data, thereby enabling the return path data to be used to generated respondent-level audience measurement data. Geographic location classification implemented in accordance with the teachings of this disclosure assigns synthetic respondents to geographic locations based on values of demographic features of the synthetic respondents and aggregate values of demographic features known for the geographic locations. Furthermore, geographic location classification as disclosed herein can assign synthetic respondents to geographic locations even when there is incomplete demographic information for one or more of the geographic locations (e.g., such as when the aggregate values of one or more of the demographic features are unknown/missing for one or more of the geographic locations, when aggregate values of a demographic feature for a combination of two or more geographic locations is known but the aggregate values for the individual geographic locations in the combination are unknown, etc.). As such, geographic location classification as disclosed herein can assign synthetic respondents, which represent return path data respondents, to geographic locations under a plethora of different audience measurement scenarios and at a level of geographic granularity not represented in the original return path data itself.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    memory; and
    at least one processor to execute computer readable instructions to at least:
        associate demographic features of monitored panelists of known geographic locations as demographic features of respondents in geographic locations that are a subset of the known geographic locations;
        construct a model that is to return a plurality of probabilities that respective ones of the respondents are associated with respective ones of the geographic locations, the model based on parameters representative of aggregate values of demographic features for the geographic locations;
        determine values of the parameters based on a combination of a first function and a second function, wherein the first function to combine the parameters with values of the demographic features for the respective ones of the respondents, wherein the second function to combine, the parameters with the aggregate values of the demographic features associated with the respective ones of the geographic locations; and
        determine, based on the model, the plurality of probabilities that respective ones of the respondents are associated with respective ones of the geographic locations.

2. The apparatus of claim 1, wherein a first one of the respondents is a synthetic respondent representative of return path data reported by a media presentation device associated with a media service provider, and the at least one processor is to provide the plurality of probabilities to an audience measurement entity that is to perform audience measurement based on the return path data.

3. The apparatus of claim 1, wherein the at least one processor is to determine the plurality of parameters to minimize the combination of the first function and the second function.

4. The apparatus of claim 1, wherein the combination of the first function and the second function corresponds to a difference between the first function and the second function.

5. The apparatus of claim 1, wherein the at least one processor is to obtain the demographic features of the monitored panelists of the known geographic locations from an audience measurement entity that monitors media presentation activity of the monitored panelists via a metering device or a local people meter.

6. The apparatus of claim 5, wherein the audience measurement entity obtains the media presentation activity as return path data that includes data indicative of the known geographic locations.

7. The apparatus of claim 1, wherein the geographic locations that are a subset of the known geographic locations comprise at least one of a county, a zip code, or any other subset of a known geographic location of the known geographic locations.

8. A method, comprising:
    associating demographic features of monitored panelists of known geographic locations as demographic features of respondents in geographic locations that are a subset of the known geographic locations;
    constructing a model that is to return a plurality of probabilities that respective ones of the respondents are associated with respective ones of the geographic locations, the model based on parameters representative of aggregate values of demographic features for the geographic locations;
    determining values of the parameters based on a combination of a first function and a second function, wherein the first function to combine the parameters with values of the demographic features for the respective ones of the respondents, wherein the second function to combine, the parameters with the aggregate values of the demographic features associated with the respective ones of the geographic locations; and
    determining, based on the model, the plurality of probabilities that respective ones of the respondents are associated with respective ones of the geographic locations.

9. The method of claim 8, further comprising:
    obtaining the demographic features of the monitored panelists of the known geographic locations from an audience measurement entity that monitors media presentation activity of the monitored panelists via a metering device or a local people meter.

10. The method of claim 9, wherein the audience measurement entity obtains the media presentation activity as return path data that includes data indicative of the known geographic locations.

11. The method of claim 8, wherein the geographic locations that are a subset of the known geographic locations comprise at least one of a county, a zip code, or any other subset of a known geographic location of the known geographic locations.

12. The method of claim 8, wherein a first one of the respondents is a synthetic respondent representative of return path data reported by a media presentation device associated with a media service provider, and the method further comprises:
    providing the plurality of probabilities to an audience measurement entity that is to perform audience measurement based on the return path data.

13. The method of claim 8, further comprising:
    determining the plurality of parameters to minimize the combination of the first function and the second function.

14. The method of claim 8, wherein the combination of the first function and the second function corresponds to a difference between the first function and the second function.

15. A non-transitory computer readable medium comprising instructions that, when executed, cause a processor to at least:
    associate demographic features of monitored panelists of known geographic locations as demographic features of respondents in geographic locations that are a subset of the known geographic locations;

construct a model that is to return a plurality of probabilities that respective ones of the respondents are associated with respective ones of the geographic locations, the model based on parameters representative of aggregate values of demographic features for the geographic locations;

determine values of the parameters based on a combination of a first function and a second function, wherein the first function to combine the parameters with values of the demographic features for the respective ones of the respondents, wherein the second function to combine, the parameters with the aggregate values of the demographic features associated with the respective ones of the geographic locations; and determine, based on the model, the plurality of probabilities that respective ones of the respondents are associated with respective ones of the geographic locations.

16. The non-transitory computer readable medium of claim 15, wherein the instructions cause the processor to obtain the demographic features of the monitored panelists of the known geographic locations from an audience measurement entity that monitors media presentation activity of the monitored panelists via a metering device or a local people meter.

17. The non-transitory computer readable medium of claim 16, wherein the audience measurement entity obtains the media presentation activity as return path data that includes data indicative of the known geographic locations.

18. The non-transitory computer readable medium of claim 15, wherein the geographic locations that are a subset of the known geographic locations comprise at least one of a county, a zip code, or any other subset of a known geographic location of the known geographic locations.

19. The non-transitory computer readable medium of claim 15, wherein a first one of the respondents is a synthetic respondent representative of return path data reported by a media presentation device associated with a media service provider, and the at least one processor is to provide the plurality of probabilities to an audience measurement entity that is to perform audience measurement based on the return path data.

20. The non-transitory computer readable medium of claim 15, wherein the instructions cause the processor to determine the plurality of parameters to minimize the combination of the first function and the second function.

* * * * *